(12) United States Patent
Tsai et al.

(10) Patent No.: US 7,911,703 B2
(45) Date of Patent: Mar. 22, 2011

(54) MANUFACTURING METHOD FOR A WAFER LENS MODULE AND THE STRUCTURE THEREOF

(75) Inventors: Chia-Hsi Tsai, Taipei (TW); Cheng-Te Tseng, Taipei (TW); Tzu-Kan Chen, Taipei (TW); Meng-Hsin Kuo, Taishan Township, Taipei County (TW)

(73) Assignees: Silitek Electronic (Guangzhou) Co., Ltd., Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 12/461,778

(22) Filed: Aug. 25, 2009

(65) Prior Publication Data

US 2010/0073781 A1 Mar. 25, 2010

(30) Foreign Application Priority Data

Sep. 22, 2008 (CN) .......................... 2008 1 0211431

(51) Int. Cl.
*G02B 3/00* (2006.01)
*G02B 7/00* (2006.01)

(52) U.S. Cl. ........................ 359/642; 359/811; 264/2.5
(58) Field of Classification Search ................ 359/642, 359/649–700, 811–824; 264/2.4–2.7
See application file for complete search history.

(56) References Cited

U.S. PATENT DOCUMENTS

| 6,921,676 | B2 * | 7/2005 | Ertel et al. | ...................... 438/29 |
| 2008/0278621 | A1 * | 11/2008 | Cho et al. | ...................... 348/374 |
| 2010/0053318 | A1 * | 3/2010 | Sasaki | ............................ 348/125 |

* cited by examiner

*Primary Examiner* — Mohammed Hasan
(74) *Attorney, Agent, or Firm* — Rosenberg, Klein & Lee

(57) ABSTRACT

The present invention provides a manufacturing method for a wafer lens module including the steps of providing a plastic material with high thermal resistance, wherein the high temperature plastic material can be used at a reflow temperature above 250□; and forming the high temperature plastic material into a wafer lens module integrally. The method can form an integrated wafer lens module and simplify the manufacturing procedures. Furthermore, a wafer lens unit formed by stacking another wafer lens module on the wafer lens module manufactured by the method can have improved optical image quality.

18 Claims, 5 Drawing Sheets

1

MANUFACTURING METHOD FOR A WAFER LENS MODULE AND THE STRUCTURE THEREOF

BACKGROUND OF THE INVENTION

1. Field of the Invention

The present invention relates to a manufacturing method for a wafer lens module and the structure of the wafer lens module, and in particular to a method using a high temperature plastic material for manufacturing the wafer lens module and the structure thereof.

2. Description of Related Art

People are sensitive to visual images and instinctively attracts to and response to visual cues generated by the images. Generally speaking, image device is widely used in many applications for attracting people's attention. For example, lens module is used in the mobile phone system so that people can see each other when talking on the phone.

Please refer to FIG. 1, a traditional wafer lens module is shown. Therein, the wafer lens unit 1' is, for example, a 2G (2 glass) lens unit. The wafer lens unit 1' has a lower wafer lens module 10' and an upper wafer lens module 11'. The lower wafer lens module 10' includes a substrate 101' made of glass material, a first upper optical lens 102' disposed on the top surface of the substrate 101', and a first bottom optical lens 103' disposed on the bottom surface of the substrate 101'. The first upper optical lens 102' and the first bottom optical lens 103' have different optical properties, i.e. negative and positive lens. Similarly, the upper wafer lens module 11' includes a substrate 111' made of glass material, a second upper optical lens 112' disposed on the top of the substrate 111', and a second bottom optical lens 113' disposed on the bottom of the substrate 111'. The above-mentioned lens module is formed by packaging the upper and lower wafer lenses on the substrates. Furthermore, a first spacer 12' is disposed between the lower wafer lens module 10' and the upper wafer lens module 11' for meeting the requirement of the optical path. The first spacer 12' also can protect the optical lenses 102' and 113' from scratches. Similarly, a second spacer 13' is disposed under the bottom surface of the substrate 101' and the first bottom optical lens 103' of the lower wafer lens module 10' is surrounded by the second spacer 13' for protecting the first bottom optical lens 103' from scratch. Traditionally, the spacer is mounted on the wafer lens unit 1' by post processing method, for example the spacer is attached on the glass substrate by gluing. For example, the second spacer 13' is attached on the bottom surface of the lower wafer lens module 10' by glue method. Therefore, there is a glue layer between the spacer and the substrate. It is thus necessary to control the thickness of the glue layer because the thickness is critical for the outputting image. In other words, the optical axis of the upper wafer lens module may not align to that of the lower wafer lens module because of the un-uniform thickness of the glue layer to cause the image to deviate from an accurate focus.

Furthermore, the aforementioned spacer is made by ordinary plastic materials which are easily deformed and the dimensions of the spacer are not as precise for the reason of the manufacturing method for the spacer. Therefore, in assembling step, the mis-alignment of the upper wafer lens module 11' and the lower wafer lens module 10' causes the optical axis of the upper wafer lens module may not align to that of the lower wafer lens module and the image quality is decreased.

Therefore, in view of this, the inventor proposes the present invention to overcome the above problems based on his expert experience and deliberate research.

SUMMARY OF THE INVENTION

The primary object of the present invention provides a manufacturing method for a wafer lens module and the structure thereof. The method is applied for forming an integral wafer lens module made by a high temperature plastic material to substitute for the prior art wafer lens module. Therefore, the manufacturing cost is reduced due to the high integrity of the method (i.e. the upper and lower lens with high precise alignment). Furthermore, the spacer element can be omitted in the present invention and the precision of the wafer lens assembly is achieved.

In order to achieve the above object, the present invention provides a manufacturing method for a wafer lens module. The method includes the following steps. Step 1 is providing a high temperature plastic material, the high temperature plastic material being applied at a reflow temperature. Step 2 is forming the high temperature plastic material into an integral wafer lens module, wherein the wafer lens module includes a main body, a first optical structure and a second optical structure, and the two optical structures are formed on opposite sides of the main body.

The present invention further provides another method for manufacturing the wafer lens module. The high temperature plastic material is formed into a wafer lens panel which includes more than one first wafer lens modules (i.e., lower wafer lens module). After assembling the second wafer lens module (i.e., upper wafer lens module) on each of the first wafer lens module, the collected first wafer lens modules are separated into individual ones. Thus the wafer lens units can be manufactured efficiently.

The present invention demonstrates that a wafer lens module is formed integrally by a high temperature plastic material. The wafer lens module has a main body, a first optical structure formed on the top surface of the main body, and a second optical structure formed on the bottom surface of the main body. On the other hand, the structure of the wafer lens module can be pre-designed so as to project a predetermined image.

The present invention provides a high temperature plastic material for manufacturing an integral wafer lens module, and the integral wafer lens module can be used to substitute for the parts of the traditional wafer lens module, such as spacer and the glass substrate. Therefore, the manufacturing method is simplified.

The wafer lens module made of the high temperature plastic material can be assembled on another wafer lens module with high precision so that the quality of the outputting image is improved.

In order to better understand the characteristics and technical contents of the present invention, a detailed description thereof will be made with reference to the accompanying drawings. However, it should be understood that the drawings and the description are illustrative only and are not for limiting the scope of the present invention.

DETAILED DESCRIPTION OF THE PREFERRED EMBODIMENTS

Figure 1:
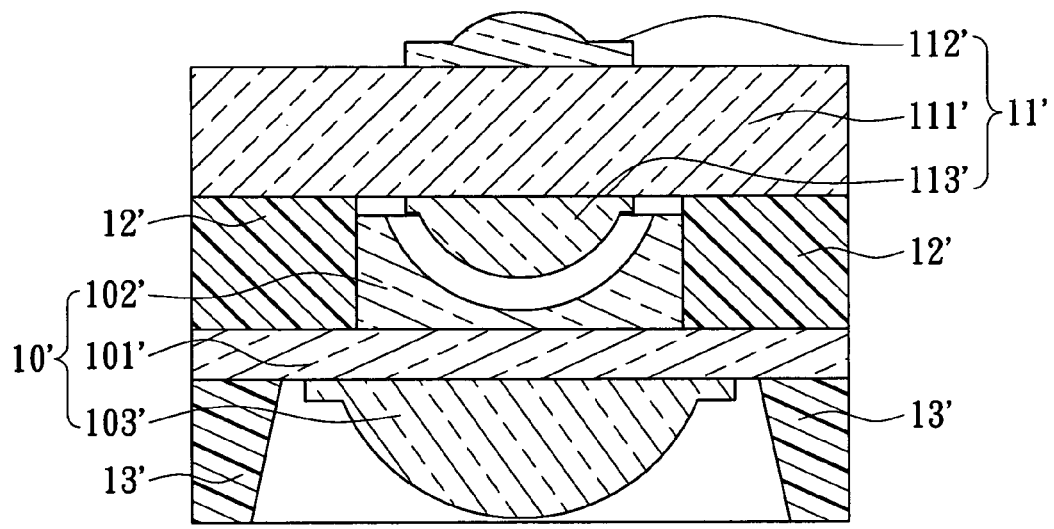
FIG. 1 is a schematic diagram showing a traditional wafer lens module.

The present invention provides a method for manufacturing an integral wafer lens module by using a kind of high temperature plastic material. The wafer lens module made from the high temperature plastic material can be applied in a reflow process with higher reflow temperature so that the wafer lens module can be formed integrally with no glass substrates and spacer elements in prior art, and then the precision of the alignment can be improved. Please refer to FIG. 2A, FIG. 2B, FIG. 3 and FIG. 4A, the manufacturing method includes the following steps.

Step 401 is providing a high temperature plastic material as material of the wafer lens module 10A and the high temperature plastic material can be applied at a reflow temperature higher than 250□.

The high temperature plastic material has some characters including superior chemical resistance, high impact resistance, and high temperatures resistance, so that the high temperature plastic material has high mechanical performance and high stability of dimensions even undergoing the reflow procedure. In other words, the high temperature plastic material is a high-temperature-resistant and non-melt plastic material in the reflow procedure. On the other hand, the high temperature plastic material can meet the requirements of the image module application, such as optical characteristics, thermal resistance, chemical resistance and small thermal expansion (the limitation of the dimensions of the image modules).

In the embodiment, the reflow oven temperature is about 250° C., and the high temperature plastic material applied in the present invention has a thermal resistance higher than 250° C. so that the wafer lens module 10A made of the high temperature plastic material can be used in the reflow process.

Step 402, the high temperature plastic material is provided for forming into the wafer lens module 10A. As an embodiment, an injection forming method may be used for forming the high temperature plastic material into the wafer lens module 10A integrally, but the forming method for the present invention is not restricted thereby. In a second embodiment, the molding method can be applied to form the high temperature plastic material into the wafer lens module 10A integrally.

In the procedures for manufacturing a wafer lens module, the wafer lens module 10A need to connects to the substrate (not shown in FIG. 2A, FIG. 2B and FIG. 3) via a reflow process. Therefore, the wafer lens module 10A which is made from a high temperature plastic material can be transferred into a reflow oven and the high reflow temperature will not take influence on the wafer lens module 10A. Contrary to the better thermal stability of the wafer lens module 10A of the present invention, the materials of the traditional wafer lens module, such as the ordinary plastic material of spacer or gluing material may be failed in the high reflow temperature.

Furthermore, the structures of the wafer lens module 10A can be adjusted for the predetermined optical performance. In the following description, the wafer lens module 10A uses a 2G (2 glasses) for the lens module so as to describe the method of the present invention, but the present invention is not limited thereby.

Figure 2A:
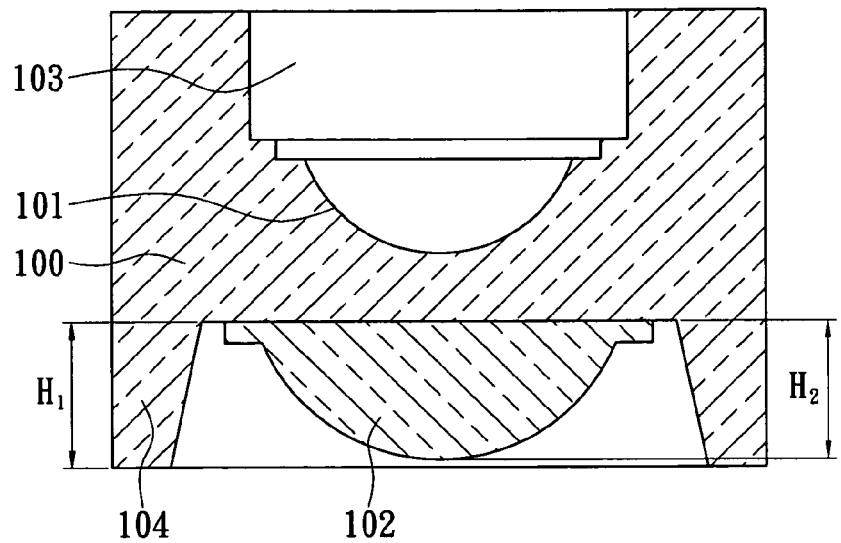
FIG. 2A is a schematic diagram showing a wafer lens module according to the present invention.
Figure 2B:
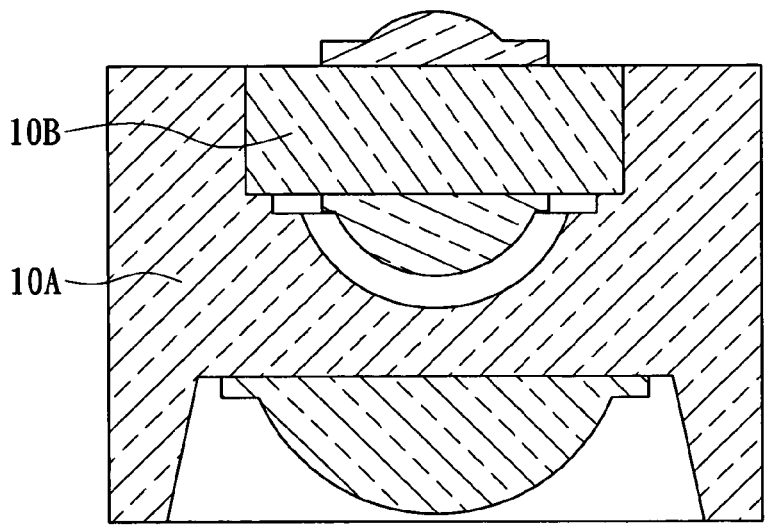
FIG. 2B is a schematic diagram showing a wafer lens module stacked on another wafer lens module according to the present invention.

In the aforementioned lens module with 2G, the wafer lens module 10A includes a main body 100 and two optical structures formed on opposite sides of the main body 100. The first optical structure 101 is formed on the top surface of the main body 100 and the second optical structure 102 is formed on the bottom surface of the main body 100. The wafer lens module 10A is made from the high temperature plastic material integrally. For example, the high temperature plastic material is injected on a mold to form the whole wafer lens module 10A. The first optical structure 101 is concaved on the top surface of the main body 100, and the second optical structure 102 is protruded on the bottom surface of the main body 100. Moreover, the optical features of the first and the second optical structure 101,102 can be adjusted according to the requirement of image performance. The wafer lens module 10A further has a locking portion 103 formed on the top surface of the main body 100, and the locking portion 103 corresponds to the first optical structure 101 for locking an another wafer lens module 10B (as shown in FIG. 2B) with the wafer lens module 10A. In the embodiment, the locking portion 103 is a locking slot and locates above the first optical structure 101.

Moreover, the wafer lens module 10A further has a protecting portion 104 extended from the bottom surface of the main body 100, and the protecting portion 104 locates around the second optical structure 102 for protecting the second optical structure 102. In the embodiment, the height of the protecting portion 104 is equal to or longer than the greatest depth of the second optical structure 102 in order to protect the second optical structure 102 from scratch.

An assembling step 403 is performed after forming the wafer lens module 10A for assembling two or more wafer lens modules 10A and 10B into a wafer lens unit 1. Please refer to FIG. 2B, the wafer lens unit 1 has an upper wafer lens module 10B and the lower wafer lens module 10A. The lower wafer lens module 10A as shown in FIG. 2B has the same structure with the wafer lens module 10A as shown in FIG. 2A and accordingly the lower wafer lens module 10A includes a main body 100 and two optical structures 101, 102 formed on opposite sides of the main body 100. On the other hand, the upper wafer lens module 10B stacks on the lower wafer lens module 10A, wherein the upper wafer lens module 10B has two different types. One type is that the upper wafer lens module 10B is a traditional glass wafer lens. In other words, the upper wafer lens module 10B is made of a glass substrate and the glass substrate has two optical structures, such as lens on the upper and bottom surfaces of the glass substrate. Alternatively, the upper wafer lens module 10B can be made by the high temperature plastic material applied in the present invention and the upper wafer lens module 10B connects to the substrate via molding forming method. Preferably, the structure of the optical lens on the bottom surface of the upper wafer lens module 10B corresponds to the first optical structure 101 of the lower wafer lens module 10A so as to improve the image quality of the wafer lens unit 1 (i.e., stacked wafer lens modules with lower wafer lens module 10A and upper wafer lens module 10B).

Due to the locking portion 103 of the lower wafer lens module 10A formed on the top surface of the main body 100 and corresponding to the first optical structure 101, the structure of the optical lens on the bottom surface of the upper wafer lens module 10B can be received and fixed inside the locking portion 103 and the lower wafer lens module 10A and the upper wafer lens module 10B can be assembled precisely. In the embodiment, the locking portion 103 is a concave (i.e., locking slot) and the dimension of the concave corresponds to that of the upper wafer lens module 10B so that the upper wafer lens module 10B and the lower wafer lens module 10A can be assembled precisely and perform along the same optical axis. In other words, the assembly of the upper wafer lens module 10B and the lower wafer lens module 10A achieves high precision of optical axis and the problem of off-center in stacking wafer lens modules would not occur.

Moreover, the main body 100 of the lower wafer lens module 10A has a protecting portion 104 as shown in FIG. 2A. Discussing with the length in the optical path and the requirement of the protection, the protecting portion 104 extends from the bottom surface of the main body 100 and it locates around the second optical structure 102. In other words, the protecting portion 104 protects the second optical structure 102 from the impact by the external force and better image quality is achieved because of the extending length of the protecting portion 104. In the embodiment, the extending length H1 of the protecting portion 104 in the direction of optical axis (i.e. the height of the protecting portion 104) is equal to or longer than the greatest depth H2 of the second optical structure 102 in order to protect the second optical structure 102 and achieve better optical performance. Accordingly, the lower wafer lens module 10A in this invention is an integral structure so that the traditional lower wafer lens module 10', the first spacer 12', and the second spacer 13' in FIG. 1 are replaced for the integral lower wafer lens module 10A. In other words, the three parts in traditional lens module 10' are omitted and replaced for one integral part of the wafer lens module 10A of the present invention so that the number of manufacturing steps is reduced. Furthermore, the positioning issue with gluing on the spacers is solved.

The present invention provides another method for manufacturing the wafer lens modules using the high temperature plastic material which can be applied at a reflow temperature higher than 250° C.

Figure 3:
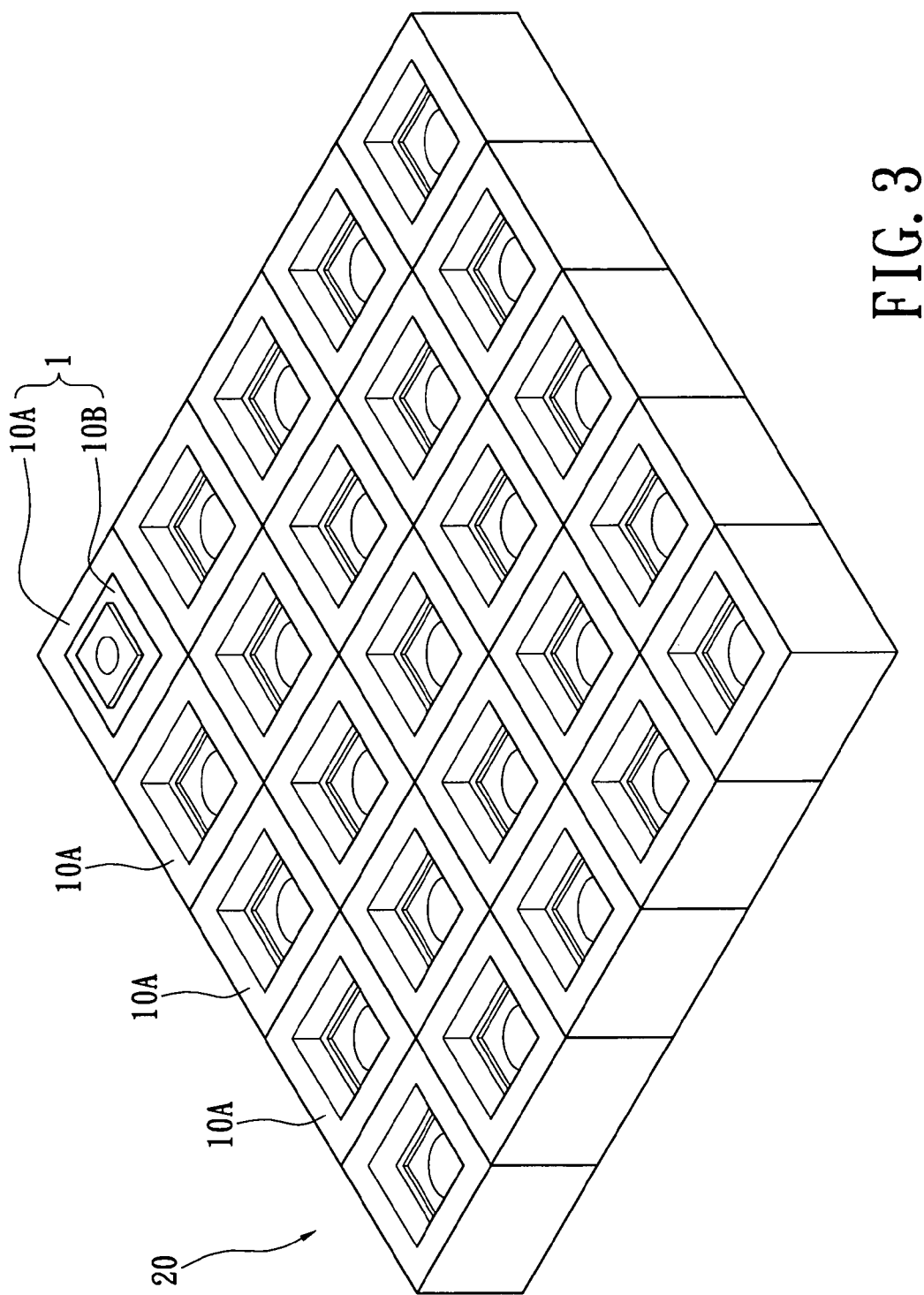
FIG. 3 is a schematic diagram showing a wafer lens panel and one wafer lens unit according to the present invention.
Figure 4A:
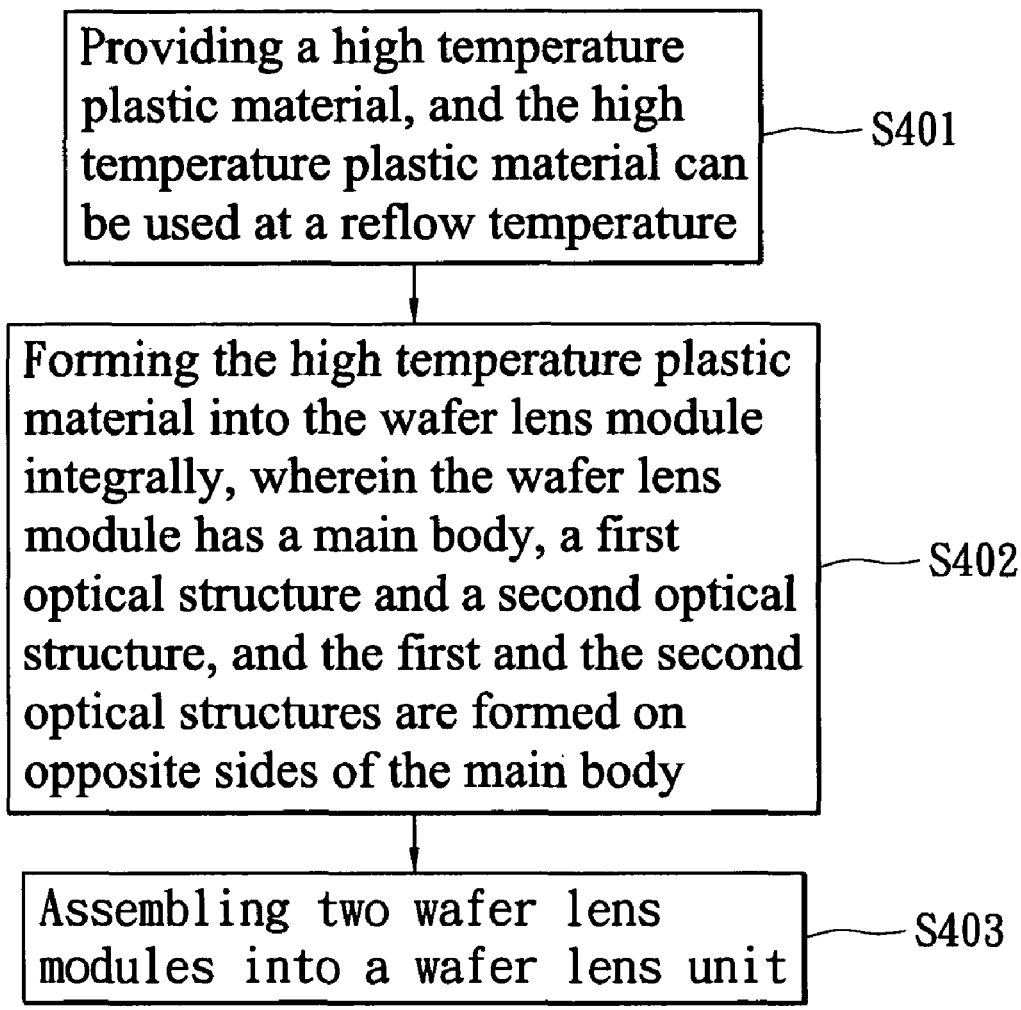
FIG. 4A shows the manufacturing method of the wafer lens module according to the present invention.
Figure 4B:
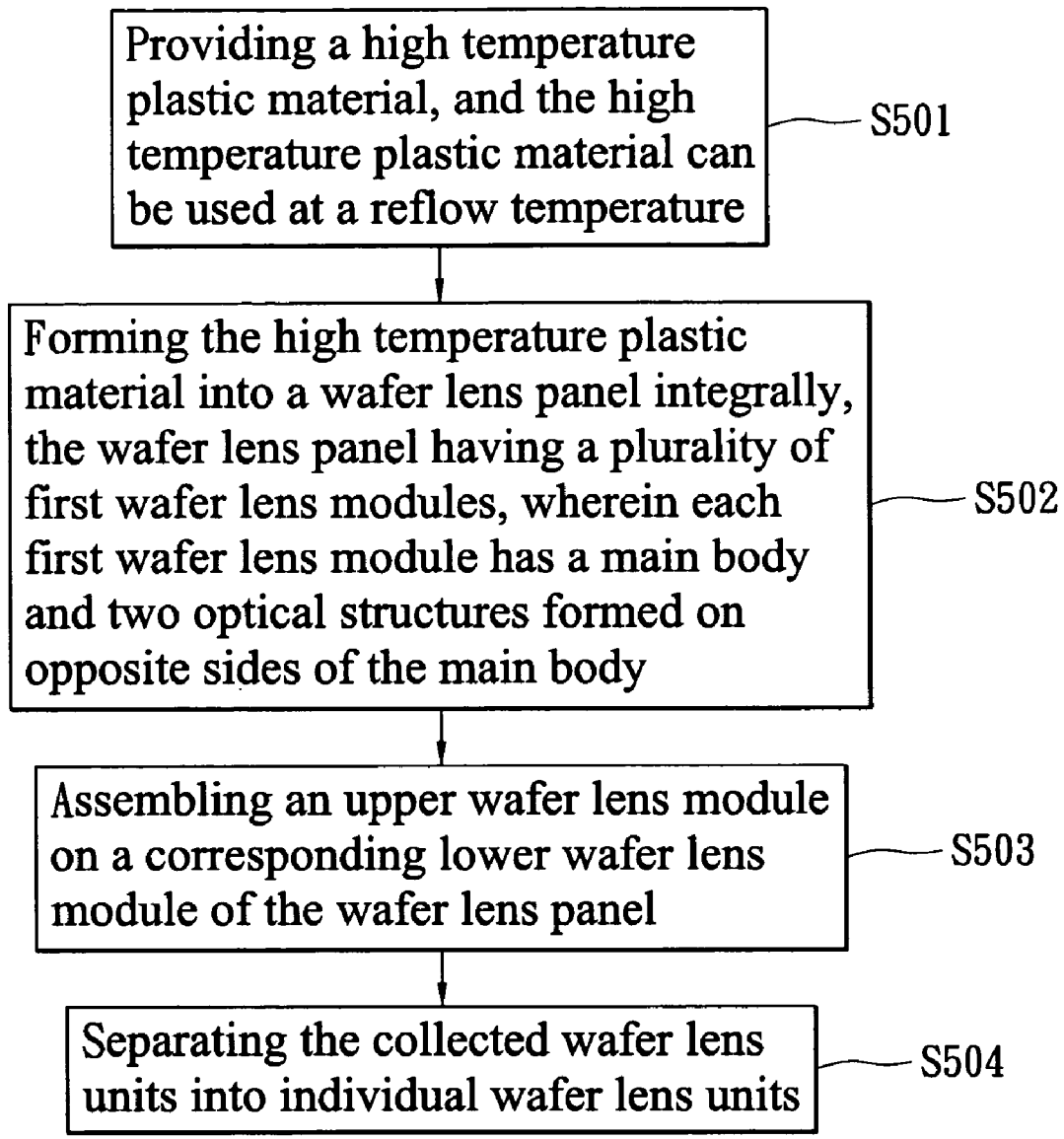
FIG. 4B shows the manufacturing method of the wafer lens unit according to the present invention.

Please refer to FIG. 3 and FIG. 4B, Step 501 is providing a high temperature plastic material and the high temperature plastic material can be applied at a reflow temperature higher than 250□. Step 502, the high temperature plastic material is formed into a wafer lens panel 20 integrally, for example, by molding method. The wafer lens panel 20 has a plurality of the lower wafer lens modules 10A.

In the embodiment, the present invention shows the method for manufacturing the 2G wafer lens modules. The high temperature plastic material is made into a wafer lens panel 20 with twenty-five lower wafer lens modules 10A integrally. However, it should be understood that the drawings and the description are illustrative only and are not for limiting the scope of the present invention. Likewise, each lower wafer lens module 10A (same as the wafer lens module 10A shown in FIG. 2A) includes a main body 100, two optical structures 101, 102 formed on opposite sides of the main body 100, locking portion 103, and the protecting portion 104.

After the forming step 502 of the wafer lens panel 20, a plurality of the upper wafer lens module 10B is provided for assembling on the lower wafer lens modules 10A of the wafer lens panel 20 (Step 503). Therefore, each of the upper wafer lens modules 10B is stacked on each of the lower wafer lens modules 10A respectively so that twenty-five wafer lens units 1 are formed. For example, the upper wafer lens module 10B is stacked on the lower wafer lens module 10A at the northwest corner of the wafer lens. panel 20 so as to form a wafer lens unit 1 in FIG. 3. Preferably, each upper wafer lens module 10B is disposed in the locking portion 103 of each lower wafer lens module 10A of the wafer lens panel 20 precisely so that the image quality is improved.

The method includes Step 504, a cutting step after the step for assembling the upper wafer lens module 10B on the wafer lens module 10A of the wafer lens panel 20. The cutting step is provided for separating the collected wafer lens units 1 into a plurality of individual one.

According to the present invention, the wafer lens module 10A is integrally formed by a high temperature plastic material. The wafer lens module 10A includes a main body 100, the first optical structures 101 formed on the top surface of the main body 100, and the second optical structures 102 formed on the bottom surface of the main body 100. The present invention provides two methods for manufacturing the wafer lens unit 1. One method is provided for forming a single wafer lens module 10A and the other method is provided for forming a wafer lens penal 20 with a plurality of wafer lens modules 10A. The above-mentioned methods can be applied for assembling the upper wafer lens module 10B on the wafer lens module 10A (i.e. the lower wafer lens module 10A) to form the wafer lens unit 1 with high precision. Taking the 2G wafer lens module for example, the lower wafer lens module 10A has a locking portion 103 for fixing the upper wafer lens module 10B on the lower wafer lens module 10A in order to align the optical axis of the upper wafer lens module 10B from that of the lower wafer lens module 10A precisely.

Therefore, the present invention provides some advantages as following.

1. The manufacturing procedures of the wafer lens module are simplified and integrated. A high temperature plastic material is applied in the wafer lens module manufacturing method so that the parts of the traditional wafer lens module, such as optical structure, the glass substrate, and the spacer can be omitted and replaced for one integral part of the wafer lens module 10A. In other words, many parts which are stacked to form the traditional wafer lens module 10' are replaced for one integral element of the wafer lens module 10A of the present invention. Thus, the number of manufacturing steps is reduced and the effect of integrating the manufacturing procedures is achieved.
2. The wafer lens unit formed by the method of the present invention is used for improving the image quality. A locking portion is formed in non-optical area of the main body of the wafer lens module, and the locking portion can be used for fixing another wafer lens module thereon so that the precision of the assembly is improved.
3. Another method for manufacturing the wafer lens penal is disclosed so that the wafer lens module can be formed efficiently and increase production capacity.

Even though the present invention has been described with reference to the foregoing preferred embodiment, it shall be understood that the present invention is not limited to the details thereof. Various equivalent variations and modifications may occur to those skilled in this art in view of the teachings of the present invention. Thus, all such variations and equivalent modifications are also embraced within the scope of the present invention as defined in the appended claims.

What is claimed is:

1. A manufacturing method for a wafer lens module, comprising:
   providing a high temperature plastic material, the high temperature plastic material being applied at a reflow temperature; and
   forming the high temperature plastic material into the wafer lens module integrally, wherein the wafer lens module comprises a main body, a first optical structure, a second optical structure and a locking portion, and the first and the second optical structures are formed on opposite sides of the main body, the locking portion is formed on a top surface of the main body, and the locking portion corresponds to the first optical structure for locking the another wafer lens module with the wafer lens module.

2. The manufacturing method for a wafer lens module according to claim 1, wherein the high temperature plastic material is formed into the wafer lens module integrally by an injection molding method.

3. The manufacturing method for a wafer lens module according to claim 1, further comprising an assembling step for stacking another wafer lens module on the wafer lens module to construct a wafer lens unit.

4. The manufacturing method for a wafer lens module according to claim 1, wherein the first optical structure is concaved on the top surface of the main body, and the second optical structure is protruded on the bottom surface of the main body.

5. The manufacturing method for a wafer lens module according to claim 4, wherein the wafer lens module further comprises a protecting portion extended from the bottom surface of the main body, and the protecting portion is formed around the second optical structure for protecting the second optical structure.

6. The manufacturing method for a wafer lens module according to claim 5, wherein the height of the protecting portion is equal to or longer than the greatest depth of the second optical structure in order to protect the second optical structure.

7. The manufacturing method for a wafer lens module according to claim 1, wherein the reflow temperature is higher than 250° C.

8. A manufacturing method for a plurality of wafer lens modules, comprising:
providing a high temperature plastic material, the high temperature plastic material being applied at a reflow temperature;
forming the high temperature plastic material into a wafer lens panel integrally, the wafer lens panel having a plurality of wafer lens modules, wherein each wafer lens module comprises a main body, a first optical structure, a second optical structure and a locking portion, and the first and the second optical structures are formed on opposite sides of the main body, the locking portion is formed on a top surface of the main body, and the locking portion corresponds to the first optical structure for locking the another wafer lens module with the wafer lens module.

9. The manufacturing method for a plurality of wafer lens modules according to claim 8, wherein the high temperature plastic material is formed into the wafer lens panel integrally by a molding method.

10. The manufacturing method for a plurality of wafer lens modules according to claim 8, further comprising an assembling step for providing a plurality of another wafer lens modules and assembling the another wafer lens modules on the wafer lens modules respectively to construct a plurality of wafer lens units.

11. The manufacturing method for a plurality of wafer lens modules according to claim 10, further comprising a cutting step for separating the plurality of wafer lens units and forming a plurality of individual wafer lens units after the assembling step.

12. The manufacturing method for a plurality of wafer lens modules according to claim 8, wherein the reflow temperature is higher than 250° C.

13. A wafer lens module, comprising:
a main body, having a top surface and a bottom surface;
a first optical structure formed on the top surface; and
a second optical structure formed on the bottom surface;
wherein the main body, the first optical structure, and the second optical structure are made integrally from a high temperature plastic material being applied at a reflow temperature, the main body has a locking portion on the top surface thereof, and the locking portion corresponds to the first optical structure.

14. The wafer lens module according to claim 13, wherein the locking portion is a locking slot above the first optical structure for locking another wafer lens module with the wafer lens module.

15. The wafer lens module according to claim 13, wherein the main body further has a protecting portion on the bottom surface thereof, and the protecting portion is formed around the second optical structure.

16. The wafer lens module according to claim 15, wherein the protecting portion extends downward from the bottom surface of the main body and the extending length of the protecting portion is equal to or longer than the maximum depth of the second optical structure.

17. The wafer lens module according to claim 13, wherein the high temperature plastic material is formed into the wafer lens module integrally by a molding method.

18. The wafer lens module according to claim 13, wherein the first optical structure is concaved on the top surface of the main body, and the second optical structure is protruded on the bottom surface of the main body.

* * * * *